United States Patent
Mishra et al.

(10) Patent No.: US 10,409,613 B2
(45) Date of Patent: Sep. 10, 2019

(54) PROCESSING DEVICES TO PERFORM A KEY VALUE LOOKUP INSTRUCTION

(71) Applicant: Intel Corporation, Santa Clara, CA (US)

(72) Inventors: Asit K. Mishra, Hillsboro, OR (US); Kshitij A. Doshi, Chandler, AZ (US); Elmoustapha Ould-Ahmed-Vall, Chandler, AZ (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 14/757,995

(22) Filed: Dec. 23, 2015

(65) Prior Publication Data

US 2017/0185412 A1   Jun. 29, 2017

(51) Int. Cl.
*G06F 9/38* (2018.01)
*G06F 9/30* (2018.01)
*G06F 15/80* (2006.01)

(52) U.S. Cl.
CPC .......... *G06F 9/3887* (2013.01); *G06F 9/3004* (2013.01); *G06F 9/30021* (2013.01); *G06F 9/30036* (2013.01); *G06F 9/30072* (2013.01); *G06F 9/30098* (2013.01); *G06F 15/8007* (2013.01)

(58) Field of Classification Search
CPC .............. G06F 9/3004; G06F 9/30072; G06F 9/30036; G06F 9/30098; G06F 15/8007; G06F 9/30021; G06F 9/3887
See application file for complete search history.

(56) References Cited

U.S. PATENT DOCUMENTS

| | | | |
|---|---|---|---|
| 7,133,409 B1 | 11/2006 | Willardson | |
| 8,364,675 B1 * | 1/2013 | Vorobyov | G06F 17/30979 707/736 |
| 2004/0181626 A1 * | 9/2004 | Pickett | G06F 12/0864 711/3 |
| 2006/0184765 A1 | 8/2006 | Krueger | |
| 2007/0156685 A1 | 7/2007 | Inoue et al. | |
| 2007/0283127 A1 * | 12/2007 | Kohn | G06F 9/30014 711/218 |
| 2009/0100247 A1 * | 4/2009 | Moyer | G06F 9/30032 712/4 |

(Continued)

OTHER PUBLICATIONS

PCT Notification of Transmittal of The International Search Report and The Written Opinion of The International Searching Authority for PCT Application PCT/US2016/063647, dated Mar. 10, 2017, 13 pages.

*Primary Examiner* — Benjamin P Geib
*Assistant Examiner* — Kasim Alli
(74) *Attorney, Agent, or Firm* — Lowenstein Sandler LLP

(57) ABSTRACT

Single Instruction, Multiple Data (SIMD) technologies are described. A method of performing a key value lookup instruction may include storing a vector of keys to a first register and storing a vector of values corresponding to the keys to a second register. A processor may receive an instruction to perform a key value lookup instruction including a vector of key input elements. The processor may compare each key input element to each key to determine matching keys. The processor may then store values corresponding to the matching keys to an output vector in the position of the key input elements.

19 Claims, 11 Drawing Sheets

(56) References Cited

U.S. PATENT DOCUMENTS

| | | | |
|---|---|---|---|
| 2013/0024654 A1* | 1/2013 | Gove | G06F 9/30018 712/7 |
| 2013/0166516 A1* | 6/2013 | Reid | G06F 9/30072 707/690 |
| 2015/0039628 A1 | 2/2015 | Sen et al. | |

* cited by examiner

| Key 300 | 301: 5 | 302: 18 | 303: 83 | 304: 900 |
|---|---|---|---|---|
| Value 310 | 311: 754 | 312: 511 | 313: 21 | 314: 754 |
| Key input 320 | 321: 900 | 322: 5 | 323: 83 | 324: 4 |
| Output 330 | 331: 754 | 332: 754 | 333: 21 | 334: x |

FIG. 3

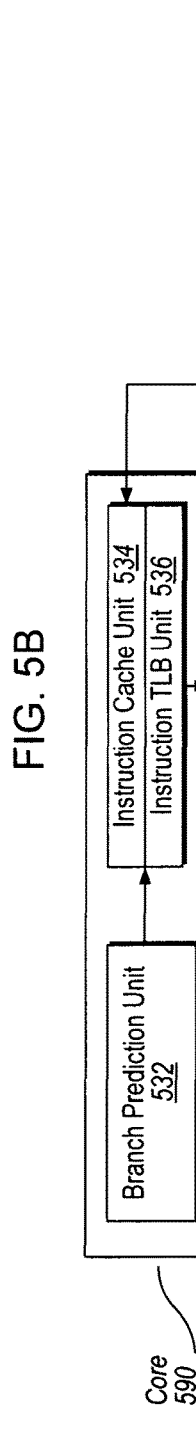
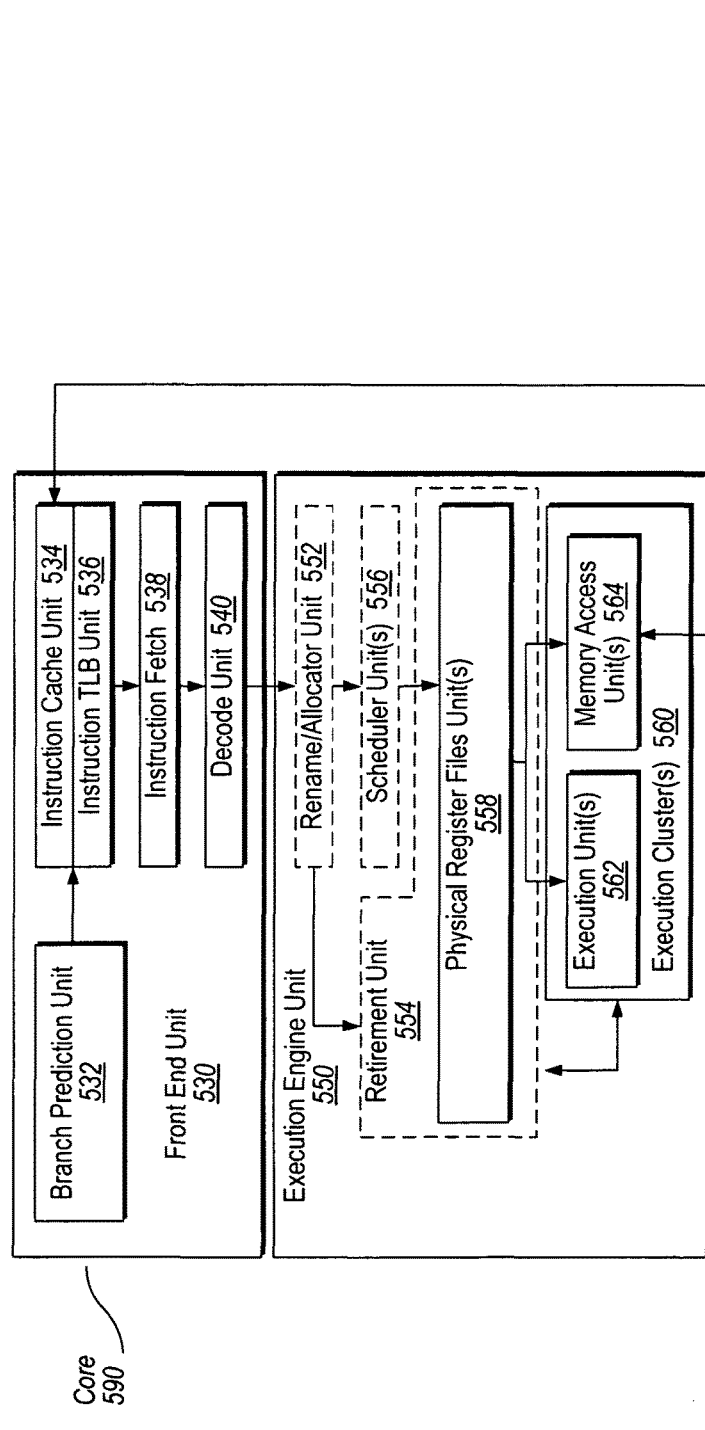
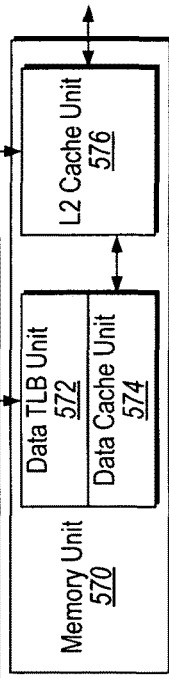
FIG. 5B
FIG. 5A

PROCESSING DEVICES TO PERFORM A KEY VALUE LOOKUP INSTRUCTION

BACKGROUND

Single Instruction, Multiple Data (SIMD) architectures can be implemented in microprocessor systems to enable one instruction to operate on several operands in parallel. SIMD architectures take advantage of packing multiple data elements within one register or contiguous memory location. With parallel hardware execution, multiple operations are performed on separate data elements by one instruction to increase a performance of the microprocessor systems.

BRIEF DESCRIPTION OF THE DRAWINGS

Various embodiments of the present invention will be understood more fully from the detailed description given below and from the accompanying drawings of various embodiments of the invention.

FIG. 3 illustrates example operations of a Single Instruction, Multiple Data key value lookup instruction according to one embodiment.

FIG. 5A is a block diagram illustrating an in-order pipeline and a register renaming stage, out-of-order issue/execution pipeline according to one embodiment.

FIG. 5B is a block diagram illustrating a micro-architecture for a processor that implements secure memory repartitioning according to one embodiment.

DESCRIPTION OF EMBODIMENTS

Figure 1:
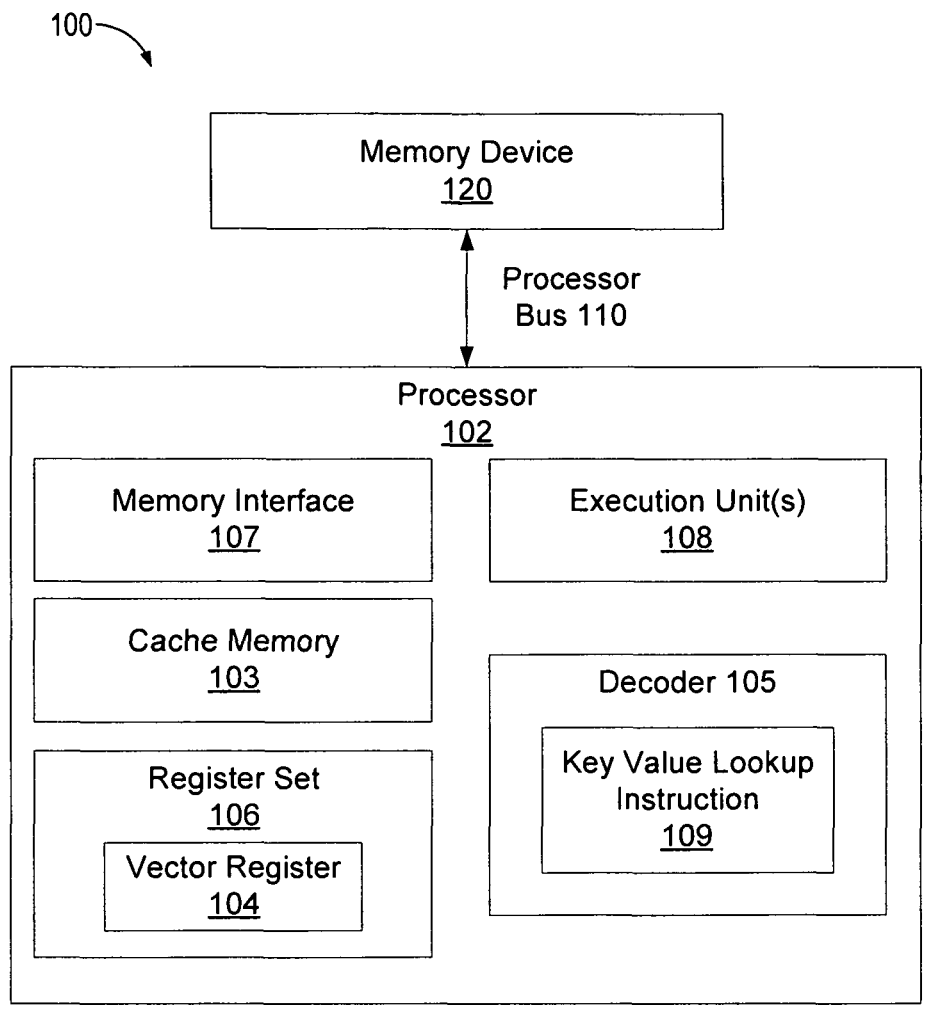
FIG. 1 is a block diagram illustrating a computing system that implements a key value lookup instruction according to one embodiment.

A processor may use vector instruction sets or single instruction, multiple data (SIMD) instruction sets to perform multiple operations in parallel. A processor can perform multiple operations in parallel, simultaneously applying operations to the same piece of data or multiple pieces of data at the same time. Vectorization is an operation to convert a scalar program that only operates on one pair of operands at once to a vector program that can run multiple operations from a single instruction. For example, vectorization may involve rewriting a loop operation to perform a SIMD instruction, where instead of processing a single element of an array N times, it processes M elements of the array simultaneously N/M times.

Vectorization can implement a key value lookup instruction to identify values based on a set of key inputs. Key value lookups are a frequent operation in databases, data mining, graph analytics, and other applications. A key value lookup is performed using associated arrays, dictionaries, or map data structures. The data structure used for a key value lookup has a collection of key and value pairs. Each key in the collection of keys has a single corresponding value. In some embodiments, redundant keys are stored with a corresponding value. A key value lookup instruction may accept a key input and identify the position of the key in a key index. The key index may reference a value associated with each key. So, in the process of a key value lookup instruction, a processor may identify and return a value associated with a key input. In some embodiments, the values associated with the keys may be used references that point to another value.

In a non-vectorization implementation of a key value lookup instruction, one key input is read at a time and compared to keys in a collection of keys until there is a match. When the input key is found in the key index, the associated value is returned. For a set of key inputs, each input is compared to the keys in the collection of keys until there is a match. Processors implementing branch predictions for conditional statements may incur a high penalty for mispredictions when performing key value lookup operations. For example, branch prediction may be difficult because the occurrence of a match to one key element may be independent of a match on the previous key element. The number of hard to predict conditional branches may be reduced by implementing a key value lookup in an SIMD processor. For example, implementing a key value lookup instruction using SIMD registers may enable the processor to advance a pointer in the collection of keys by more than one element at a time. While this may increase the number of total number comparisons between key input elements and key elements performed in a key value lookup instruction, these comparisons may be executed in parallel by the SIMD instructions and also reduce the overhead of branch mispredictions.

The embodiments described herein address the above noted deficiencies by performing key value lookup instructions with SIMD operations. Two registers may be used to store a set of keys and associated values. The processor may receive an instruction to perform a key value lookup operation on a set of key inputs in a key input vector stored in another register. The processor may then perform a comparison of each element in the key input vector to each element in the set of keys. For those key inputs matching a key in the set of keys, and associated value may be returned to an output vector. Those key inputs not matching a key in the set of keys may return a mask value. In some embodiments, when comparing key inputs to a set of keys, the processor may generate a permute index. The processor may then use the permute index to perform a permute operation on the set of values associated with the keys.

FIG. 1A is a block diagram illustrating a computing system 100 that implements a key value lookup instruction according to one embodiment. The computing system 100 is formed with a processor 102 that includes one or more execution units 108 to execute a key value lookup instruction 109 and a memory decoder 105 to decode a key value lookup instruction 109. The key value lookup instruction 109 implements one or more features in accordance with one or more embodiments as described herein. The computing system 100 may be any device, but the description of various embodiments described herein is directed to processors including one or more vector registers 104 and capable of performing one or more SIMD instructions.

A register set 106 includes one or more registers to store data elements used by execution unit(s) 108 during performance of instructions. The register set 106 may store different types of data in various registers including integer registers, floating point registers, vector registers, banked registers, shadow registers, checkpoint registers, status registers, and instruction pointer register. In particular, register set 106 may include a vector register 104 that holds data for vector processing by SIMD instructions. For example, one or more vector registers 104 may store a set of keys, a set of associated values, or a set of key inputs for use in performance of a key value lookup instruction 109. One or more vector registers 104 may also be used for storing intermediate vectors generated in the performance of a key value lookup instruction 109. For instance, a permute index may be generated by execution unit 108 and stored to a vector register 104 for use in performing a key value lookup instruction 109.

Decoder 105 may decode a key value lookup instruction 109, which may specify a set of key inputs to compare to a set of key value pairs. The execution unit 108 may then, in response to the decoded key value lookup instruction 109, store one or more of key input, keys, or associated values into one or more vector register 104. The execution unit 108 may then perform operations of the key value lookup instruction 109. For example, the key value lookup instruction may perform the methods described further below with reference to FIG. 2.

Execution unit 108, including logic to perform integer and floating point operations, as well as vector operations, also resides in the processor 102. It should be noted that the execution unit may or may not have a floating point unit. The processor 102, in one embodiment, includes a microcode read-only memory (ROM) to store microcode, which when executed, is to perform processes for certain macroinstructions or handle complex scenarios. For example, the microcode may include a set of operations to perform a key value lookup instruction with an execution unit 108. For example, the microcode may include a set of micro operations that implement one or more processes described with reference to FIGS. 2-4B. In some embodiments, microcode may be potentially updateable to handle logic bugs/fixes for processor 102. In some embodiments, another memory element may comprise microcode instructions for performing operations to implement a key value lookup instruction.

In some embodiments, processor 102 includes a memory interface 107 and processor 102 is coupled to memory 120. In one embodiment, memory interface 107 may be a bus protocol for communication from processor 102 to memory 120. Memory 120 may include a dynamic random access memory (DRAM) device, a static random access memory (SRAM) device, flash memory device, or other memory device. Memory 120 stores instructions and/or data represented by data signals that are to be executed by the processor 102. For example, the memory 120 may include computer program instructions, which when compiled and decoded by decoder 105 instruct processor 102 to perform a key value lookup instruction 109. The memory 120 may also include a set of key value pairs for performing a key value lookup instruction 109, a set of key inputs, or may receive from the processor 102 results of a key value lookup instruction 109.

The processor 102 is coupled to the memory 120 via a processor bus 110. A system logic chip, such as a memory controller hub (MCH) may be coupled to the processor bus 110 and memory 120. An MCH can provide a high bandwidth memory path to memory 120 for instruction and data storage and for storage of graphics commands, data and textures. The MCH can be used to direct data signals between the processor 102, memory 120, and other components in the system 100 and to bridge the data signals between processor bus 110, memory 120, and system I/O, for example. The MCH may be coupled to memory 120 through a memory interface (e.g., memory interface 107).

In some embodiments, the processor 102 may include an internal cache memory 104. Depending on the architecture, the processor 102 may have a single internal cache or multiple levels of internal caches. For example, the processor 102 may include a Level 1 (L1) internal cache memory and a Level 2 (L2) internal cache memory. In some embodiments, system 100 may include a combination of both internal and external caches depending on the particular implementation and needs. The execution unit 108 may access data from an internal cache memory 104 for implementing a key value lookup instruction 109. For example, a set of key value pairs or key inputs used by a program operating on computer system 100 may include more elements than can be stored in a register in register set 106. In such circumstances, additional elements may be stored in cache memory 103 to improve the performance of processor 102 as additional elements are loaded from the memory device 120.

Figure 2:
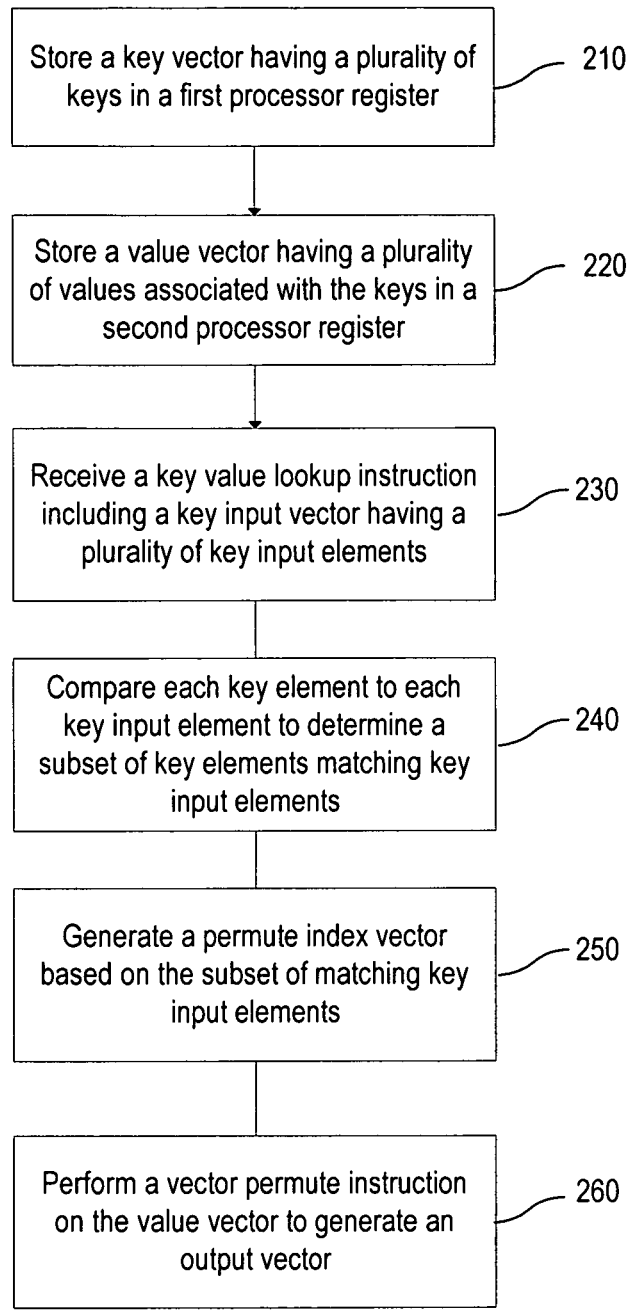
FIG. 2 illustrates a diagram of a method of performing a key value lookup operation according to one embodiment.

FIG. 2 illustrates a diagram of a method of performing a key value lookup instruction on an array of values according to one embodiment. The method may be at least partially performed by a processing device or processing logic that may include hardware (e.g. circuitry, dedicated logic, programmable logic, microcode, etc.), software (e.g., instructions executed by a processing device), firmware, or a combination thereof.

Referring to FIG. 2, the method begins with storing a vector of key elements in a first processor register in block 210. For example, the vector of key elements may be a collection of keys each paired with an associated value. In some embodiments, the collection of keys may have no repeated elements and may be stored into the first processor register in sorted order. For example, each key element may have a value greater than or equal to any key elements having a smaller offset from the base position of the vector of key elements.

The method continues in block 220 to store a vector of values in a second processor register. Each of the values in the vector of values may be associated with a key in the vector of keys in the first processor register. For example, each key may be associated with a particular value in the vector of values. The values may be stored in the same positions of the second processor register as the corresponding keys in the first processor register. For example, for a key and value pair, the key may be stored in the Nth position of the first register and the associated value may be stored in the Nth position of the second register.

In block 230 the method continues to receive a key value lookup instruction including a key input vector. The key input vector includes a set of key input elements for the processor to determine the associated output values. The processor may store the key input vector to a register of the processor for performing the key value lookup instruction.

In blocks 240-260, the processor performs operations on the various elements received in blocks 210-230 to generate an output vector according to the keys in the key input vector. For example, a particular key input vector may have key input elements with a value KIN[i] at each position i. The value KIN[i] may be compared to each element in a key vector. If the processor identifies a key with a value Key[j] at position j such that KIN[i]=Key[j], then the process may store Value[j] to Vout[i], where Value [j] is the value associated with the key Key[j], and Vout[i] is the entry in position i of the output vector. The comparison process may be repeated for each key input in the key input vector. Thus, the processor may determine a subset of the plurality of value elements. Each element in the subset of value elements may be associated with a key element that matches a key input element. The processor may then store each of the subset of value elements to an output vector. Each value element may be stored to a position having the same offset as the offset of the key input element that matches an associated key.

In block 240 of FIG. 2, the processor may compare each key input element from the key input vector to one or more key elements of the key vector. The comparison of key input elements to key elements may produce a subset of key elements that match a key input element. In certain circumstances, each key element may match a key input or no key elements may match a key input. Then the subset may include all of the key elements or none of the key elements. The comparison of the first key input to elements of the key input vector may be performed in parallel using SIMD architecture. For example, the execution unit may substantially simultaneously provide each key input element to one or more digital comparators coupled to a register storing the key input elements. The execution unit may also provide one of the key elements to each of the digital comparators such that each possible pair of a key input element and a key element is coupled to at least one digital comparator. Each of the digital comparators may then output a binary value indicating if the two inputs are equal. The digital comparators may then generate a set of outputs that indicate if each key input element is equal to a key element. Key input elements may be said to match a key if they are equal. In some embodiments, the processor may perform a series of SIMD instructions to compare the key inputs elements to the key elements. For example, for each key input element the processor may perform an instruction to compare the key input element to each element of the key vector. The processor may repeat the comparison for each key input element to determine if key input elements match any keys.

In block 250, the method may continue by generating a permute index vector based on matches between the key elements and the key input elements. In some embodiments, if a key input element does not match any key element, the processor may store a mask element into a position of the permute index associated with the key input element. For example, if a key input value in the Nth position of a key input vector matches a key in the Mth position of a key vector, the processor may store a value of M in the Nth position of the permute index vector. The permute index vector may be generated based on performing this operation for each position i in the key input vector to generate an entry in each position i of the permute index vector. If there is a key input that does not match any during comparison, a mask element may be stored to the corresponding position in the permute index vector. An example process or generating a permute index vector is described further below with reference to FIG. 4A.

In block 260, the method continues by performing a vector permute instruction on the value vector using the permute index vector to generate an output vector. Performing the vector permute instruction pulls a value to each the output vector from a position in the value vector indicated by an entry in the permute vector index. For example, for position i in the output vector, the processor may store a value Value[Index[i]], where Index[i] is the value stored in position i of the permute index vector, and Value[Index[i]] is the value stored in position Index[i] of the value vector. The permute index vector correlates each element of the key input vector with a position of a matching key in the key vector. For example, the permute index vector may include a value at a position offset from a base position of the permute index vector equal to the offset of a corresponding key input element from a base position of the key input vector. The value of the permute index at that position may reference a position of a key that matches the key input element. For example, that value may be an integer referencing the offset of the matching key value from a base position of the key vector. Thus, the permute index vector indicates to the processor an element of the value vector corresponding to the matching key element for each element of the key input vector. Thus, performing the permute instruction by the processor using the permute index vector on the value vector uses the correlation between pairs of keys and values to pass values to the output vector according to the key inputs in the key input vector. For example, for each element in the permute index vector, the processor may store a value element having a position offset from the base position of the value vector equal to the value of the element of the permute index vector. Then the processor stores the value element to a position in an output vector having the same offset in the output vector as the permute element does in the permute index vector.

FIG. 3 illustrates an example of registers of a processor during performance of a SIMD key value lookup instruction, according to an embodiment. The SIMD instruction is an example of an implementation of the method described in FIG. 2. In the example of FIG. 3, the SIMD instruction operates on memory registers with 4 memory elements. In other implementations, the SIMD register may include 8 memory elements, 16 memory elements, or another number of memory elements.

Figure 4A:
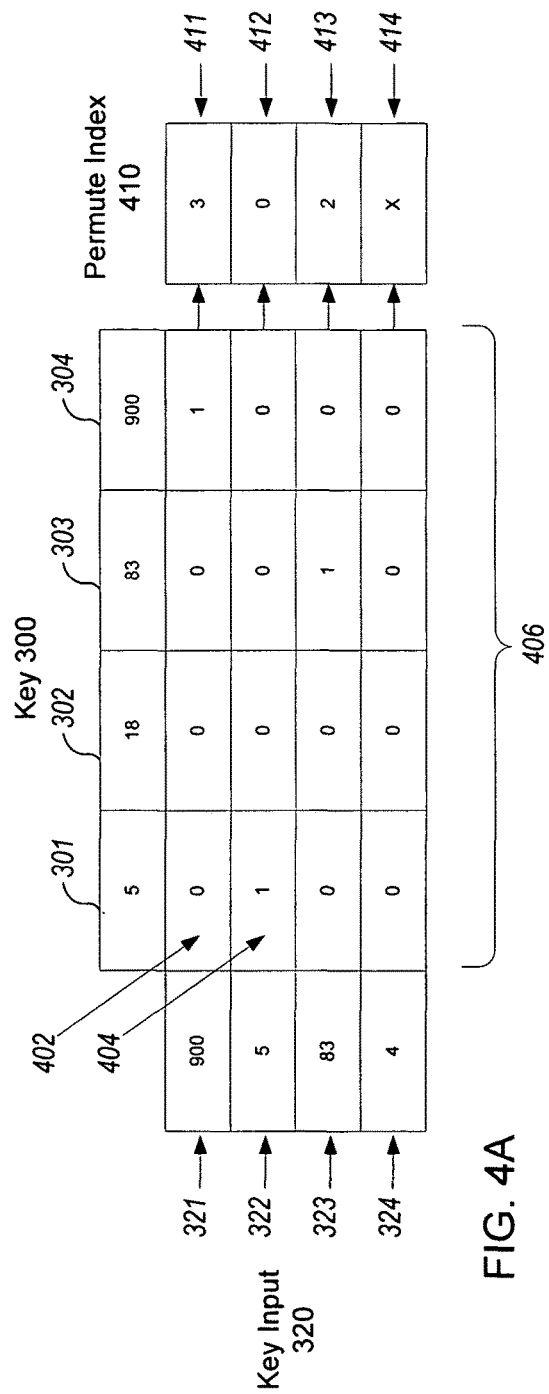
FIG. 4A illustrates example operations of a Single Instruction, Multiple Data key value lookup instruction according to one embodiment.
Figure 4B:
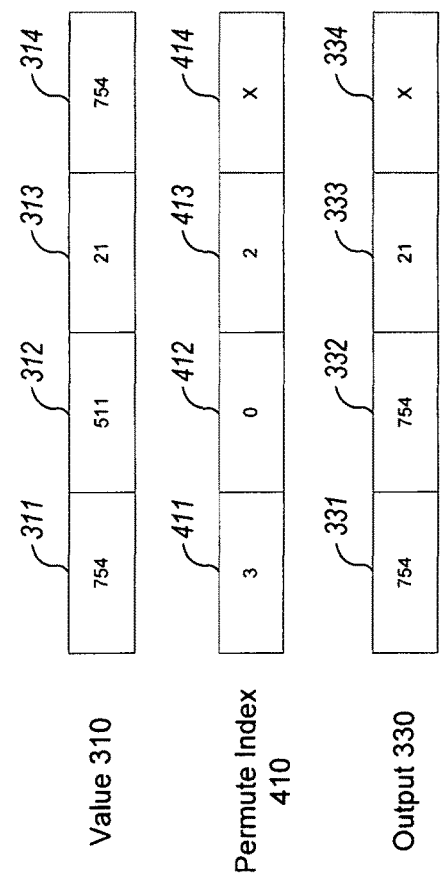
FIG. 4B illustrates example operations of a Single Instruction, Multiple Data key value lookup instruction according to one embodiment.

Key register 300 may include an array of elements 301-304 that store key values of a key vector. For consistency the registers illustrated in FIGS. 3, 4A and 4B are shown with the least significant element on the left and the most significant element on the right. For example, the value in element 301 represents position 0 in the register, the value in element 302 represents position 1 having an offset of 1 from the base position of the register, the value in element 303 represents position 2 having an offset of 2 from the base position of the register, and the value in element 304 represents position 3 having an offset of 3 from the base position of the register. A processor may receive the key vector 300, a value vector 310, a key input vector 320, and an instruction to perform a key value lookup from software operating on the processor.

Value vector 310 is an array of elements 311-314 that store values each associated with a key in the key vector. For example, the value in element 314 corresponds to the key in element 304, the value in element 313 corresponds to the key in element 303, the value in element 312 corresponds to the key in element 302, and the value in element 311 corresponds to the key in element 301.

Key input vector 320 may include a set of key inputs to compare to keys in the key vector. The processor may perform a lookup for a corresponding value from value vector 310 for each key input in key input vector 320. Output vector 330 is an output of values associated with keys that match a key input. Output vector 330 may also include one or more mask elements for a key input that does not match any of the keys. For example, key input element 321 has a value 900 that matches a key in element 304 of key vector 300. Therefore, the value 754 from corresponding element 314 in the value vector 310 is stored into the output vector 330 at element 331 corresponding to key input vector element 321. A similar process is used to generate element 332 and 333 of the output vector 330.

Element 334 of output vector 330 has a mask entry instead of a value from value vector 310. This mask entry may be generated when a key input does not match any key in the key vector 300. For example, key input element 324 has a value 4 that does not match a key in key vector 300. Therefore, there is no value in value vector 310 corresponding to the key input. Thus, a mask is stored to the corresponding position 334 of output vector 330. In some embodiments, various masks may be used to indicate that there is no match to a key input. For example, the mask may be a value that is not used by values in the value vector 310. For example the mask may be a negative value if the value vector 310 is positive numbers. In some embodiments, the mask may be a value with a binary '1' for every bit. The mask may also be a represented by a binary '1' or zero at a particular bit of the value.

FIGS. 4A and 4B illustrate an example of registers of a processor during performance of a SIMD key value lookup instruction, according to an embodiment. The SIMD instruction is an example of an implementation of the method described in FIG. 2. In particular FIG. 4A illustrates SIMD instructions generating a permute index vector for use in a key value lookup instruction and FIG. 4B illustrates an SIMD permute instruction applying the permute index vector to complete the key value lookup instruction. For example, the registers in FIGS. 4A and 4B may be generated while performing the processes described with reference to FIG. 2. In the example of FIGS. 4A and 4B, the SIMD instruction operates on memory registers with 4 memory elements. In other implementations, the SIMD register may include 8 memory elements, 16 memory elements, or another number of memory elements. In FIGS. 4A and 4B, key vector 300, key input vector 320, value vector 310, and output vector 330 are labelled the same as in FIG. 3, and may represent the same registers.

In FIG. 4A, the processor compares each element of key vector 300 to each element of key input vector 320. For illustration purposes, the results of the comparison are represented in a grid 406 with a binary value '0' representing that a corresponding key input and key not match and a binary value '1' representing that a corresponding key input and key match. For example, entry 402 indicates that the value 900 in element 321 of key input vector 320 does not match a value 5 in element 301 of key vector 300. However, entry 404 indicates that the value 5 in element 322 of key input vector 320 matches a value 5 in element 301 of key vector 300. The remaining entries in grid 406 are generated based on comparisons of values in key input vector 320 and key vector 300. The results of the comparison are used to generate a permute index vector 410. For example, the entry 404 indicates that key input 322 matches a key in element 301 of the key vector 300. Because the key input element 322 matches an entry in the least significant position of the key vector 300, the processor may store a value of zero in the corresponding entry 412 in permute index vector 410. The remaining entries in the permute index vector may be established in the same manner to generate permute index vector 410 shown in FIG. 4A. In some embodiments, the processor may determine an entry for a position in the permute index vector 410 by comparing a key input element from key input vector 320 to each key element in key vector 300 to generate a binary number for each key input. For example, the binary number generated for key input element 323 would be 0010 because it matches a key in the third position of the key vector. The processor may then perform an operation to count leading zeros of the binary number in order to generate a number indicating the position of the match. For example, the binary number 0010 has two leading zeros, so the processor stores a value of 2 to element 413 of the permute vector index. Comparisons of key input elements of a key input vector 320 to keys in a key vector 300 may be performed in parallel such that elements of the grid 406 are generated substantially simultaneously by the SIMD instruction. For example, the comparisons may be performed as discussed with reference to block 240 of FIG. 2. In some embodiments, the comparisons may be performed in hardware of the processor and the outputs in the grid 406 in FIG. 4A may be an output from hardware elements of the processor and provided to additional hardware elements to generate the permute vector 410. In some embodiments, multiple SIMD instructions are used to generate the permute index vector 410. For example, a first SIMD instruction may generate the entries in grid 406, which may be represented as an intermediate vector such that cells in the row adjacent to a key input of key input vector 320 are stored in a cell of the vector. For example, in the example of FIG. 4A, the grid may be represented as a vector [0001, 1000, 0010, 0000] with four cells, each corresponding to a key input. A second SIMD instruction may generate the permute index vector 410 by counting leading zeros of the entries in the intermediate vector.

After a permute index vector 410 is generated as discussed with reference to FIG. 4A, it may be used by the processor to perform an SIMD permute instruction. In the permute instruction, an output vector 330 is formed by pulling a value from value vector 310 according to each entry in permute index vector 410. For example, a value in the Nth position of permute index vector 410 may point to a value in value index 310 to store into the Nth position of output vector 330. Therefore, each entry i in output vector 330 has a value of Value[Index[i]], where Value[j] is the entry in position j of value vector 310, and Index[i] is the element in position i of permute index vector 410. Thus, for the example of FIG. 4B, the processor stores a value of Value[Index[0]]=Value[3]=754 into element 331 of the output vector 330. In the example, the processor also stores a value of Value[Index[1]]=Value[0]=754 into element 332 of the output vector 330. In the example, the processor also stores a value of Value[Index[2]]=Value[2]=21 into element 333 of the output vector 330. In the example, the processor also stores a mask value to Value[Index[3]]=Value[mask]='mask' into element 334 of the output vector 330. In the example, the permute index 410 may include a mask value for the entry in element 414 of permute index vector 410 because the key input in element 324 does not match a key in the key vector 300.

FIG. 5A is a block diagram illustrating a micro-architecture for a processor core 590 that implements a key value lookup instruction according to one embodiment. Specifically, processor core (also simply 'processor') 590 depicts an in-order architecture core and a register renaming logic, out-of-order issue/execution logic to be included in a processor according to at least one embodiment of the disclosure. The embodiments of the page additions and content copying can be implemented in processor 500.

Processor 590 includes a front end unit 530 coupled to an execution engine unit 550, and both are coupled to a memory unit 570. The processor 590 may include a reduced instruction set computing (RISC) core, a complex instruction set computing (CISC) core, a very long instruction word (VLIW) core, or a hybrid or alternative core type. As yet another option, processor 590 may include a special-purpose core, such as, for example, a network or communication core, compression engine, graphics core, or the like. In one embodiment, processor 590 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). The processor 590 may support an SIMD key value lookup instruction.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 590 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
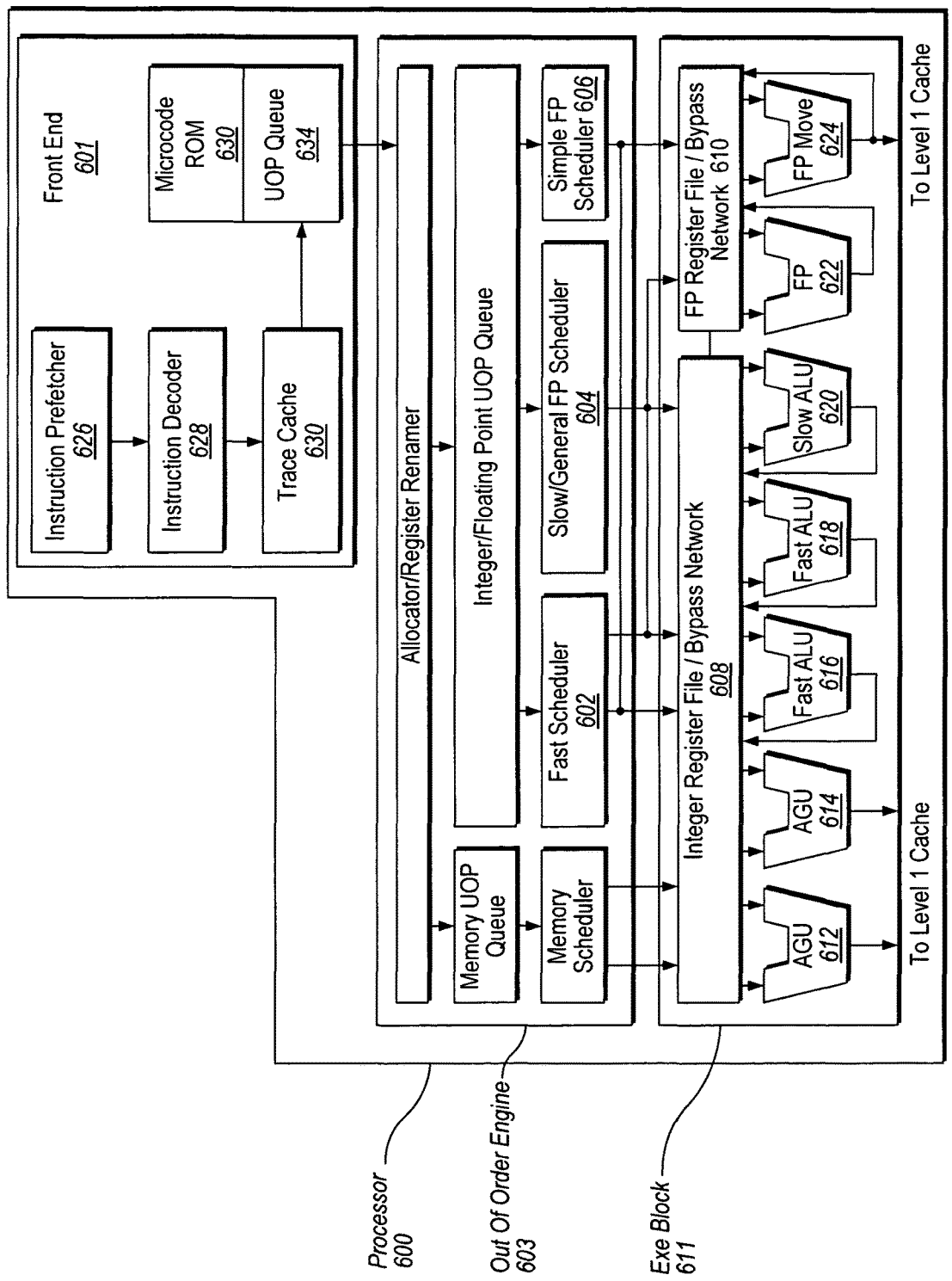
FIG. 6 illustrates a block diagram of the micro-architecture for a processor that includes logic circuits to perform secure memory repartitioning according to one embodiment.

FIG. 6 illustrates a block diagram of the micro-architecture for a processor 600 that includes logic circuits to perform a key value lookup instruction according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline. The embodiments of the page additions and content copying can be implemented in processor 600.

The front end 601 may include several units. In one embodiment, the instruction prefetcher 616 fetches instructions from memory and feeds them to an instruction decoder 618 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 618 accesses the microcode ROM 632 to do the instruction. For one embodiment, an instruction can be decoded into a small number of micro ops for processing at the instruction decoder 618. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 612, 614, execute floating point, MMX, SIMD, and SSE, or other operations. The floating point ALU 612 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 610 as the slow ALU 610 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 612, 614, can be implemented to support a range of operands having bits of various widths. For one embodiment, the floating point units 612, 614, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement a key value lookup instruction according to one embodiment. In one embodiment, the execution block 611 of processor 600 may include a microcontroller (MCU), to perform a key value lookup instruction according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight or sixteen multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
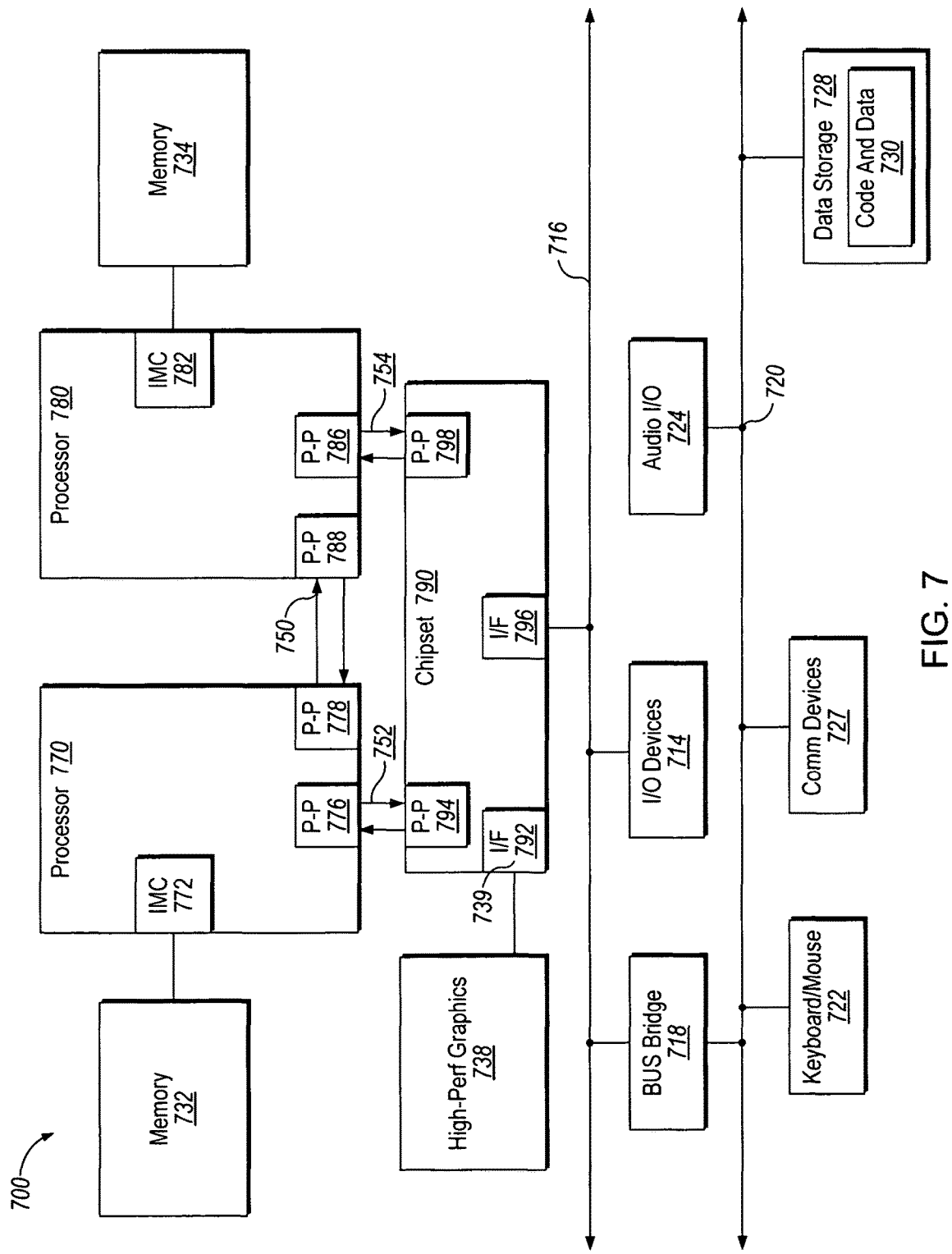
FIG. 7 is a block diagram of a computer system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores, although potentially many more cores may be present in the processors. The processors each may include hybrid write mode logics in accordance with an embodiment of the present. The embodiments of the page additions and content copying can be implemented in the processor 770, processor 780, or both.

While shown with two processors 770, 780, it is to be understood that the scope of the present disclosure is not so limited. In other implementations, one or more additional processors may be present in a given processor.

Processors 770 and 780 are shown including integrated memory controller units (IMCs) 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
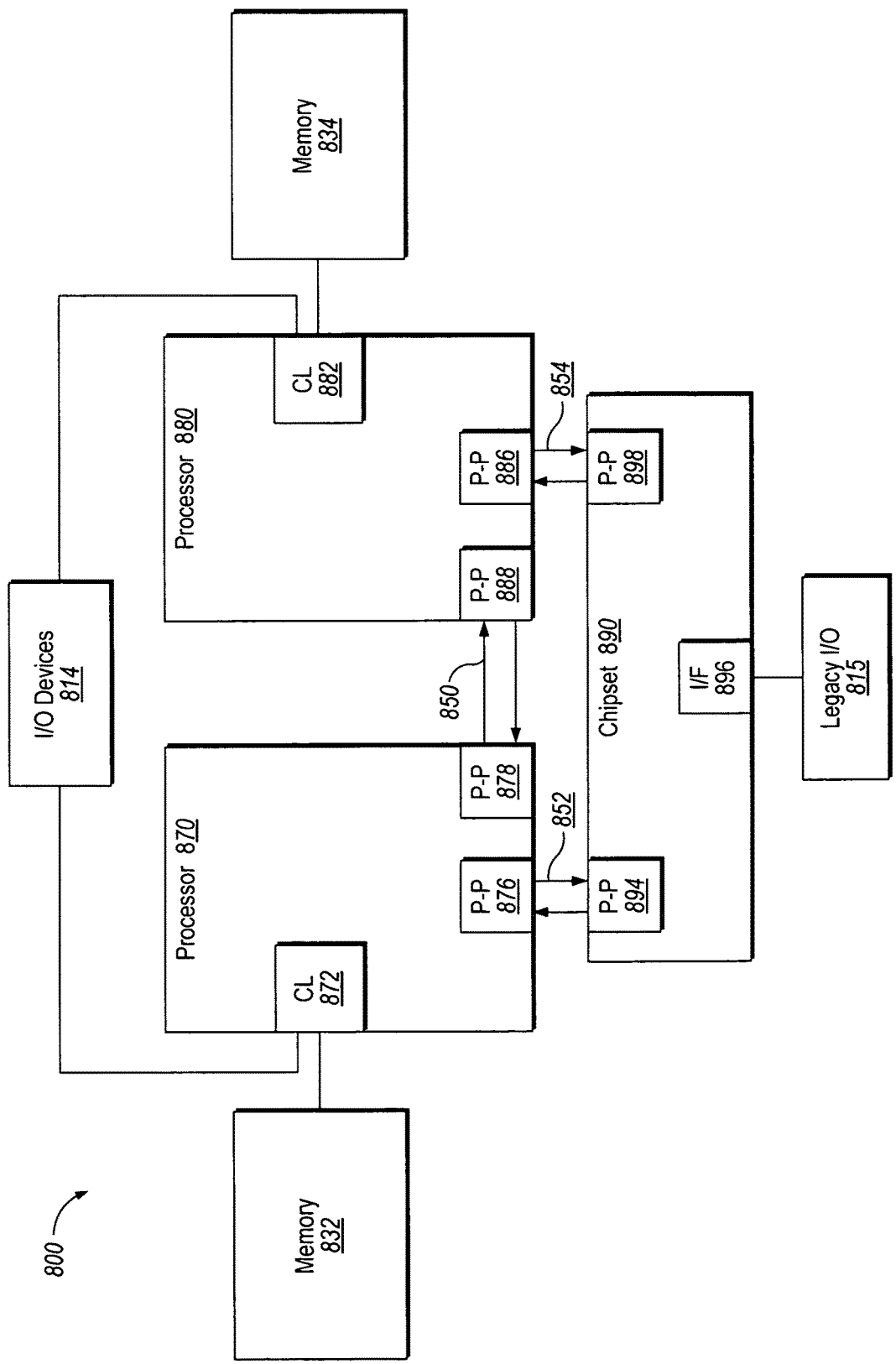
FIG. 8 is a block diagram of a computer system according to another implementation.

Referring now to FIG. 8, shown is a block diagram of a third system 800 in accordance with an embodiment of the present invention. Like elements in FIGS. 7 and 8 bear like reference numerals, and certain aspects of FIG. 6 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 6 illustrates that the memories 832, 834 are coupled to the CL 872, 882, and that I/O devices 814 are also coupled to the control logic 872, 882. Legacy I/O devices 815 are coupled to the chipset 890. The embodiments of the page additions and content copying can be implemented in processor 870, processor 880, or both.

Figure 9:
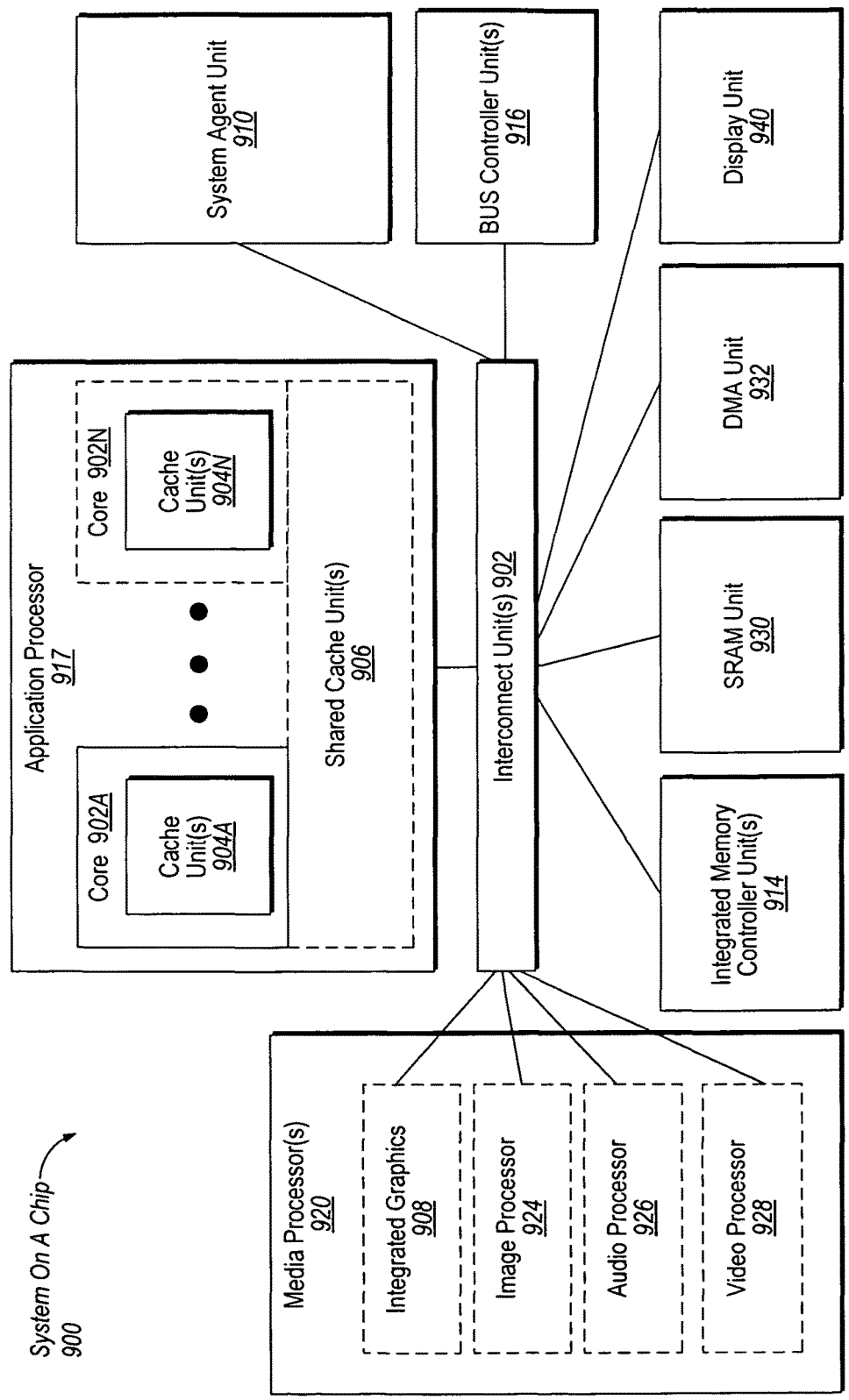
FIG. 9 is a block diagram of a system-on-a-chip according to one implementation.

FIG. 9 is an exemplary system on a chip (SoC) 900 that may include one or more of the cores 902. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 9 is a block diagram of a SoC 900 in accordance with an embodiment of the present disclosure. Dashed lined boxes are features on more advanced SoCs. In FIG. 9 an interconnect unit(s) 902 is coupled to: an application processor 917 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The embodiments of the pages additions and content copying can be implemented in SoC 900.

Figure 10:
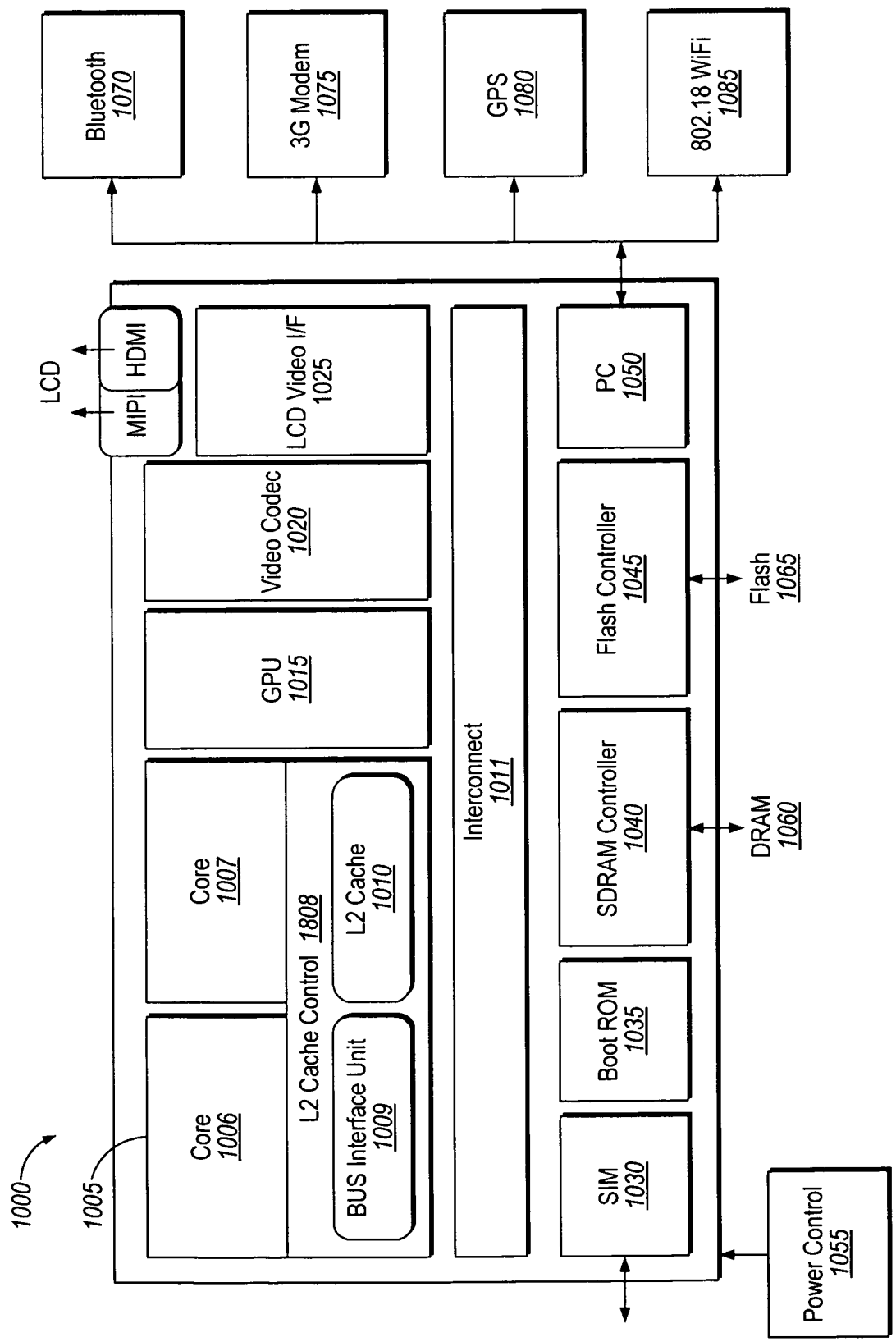
FIG. 10 illustrates another implementation of a block diagram for a computing system according to one implementation.

Turning next to FIG. 10, an embodiment of a system on-chip (SoC) design in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a Bluetooth module 1070, 3G modem 1075, GPS 1080, and Wi-Fi 1085. Note as stated above, a UE includes a radio for communication. As a result, these peripheral communication modules may not all be included. However, in a UE some form of a radio for external communication should be included.

Figure 11:
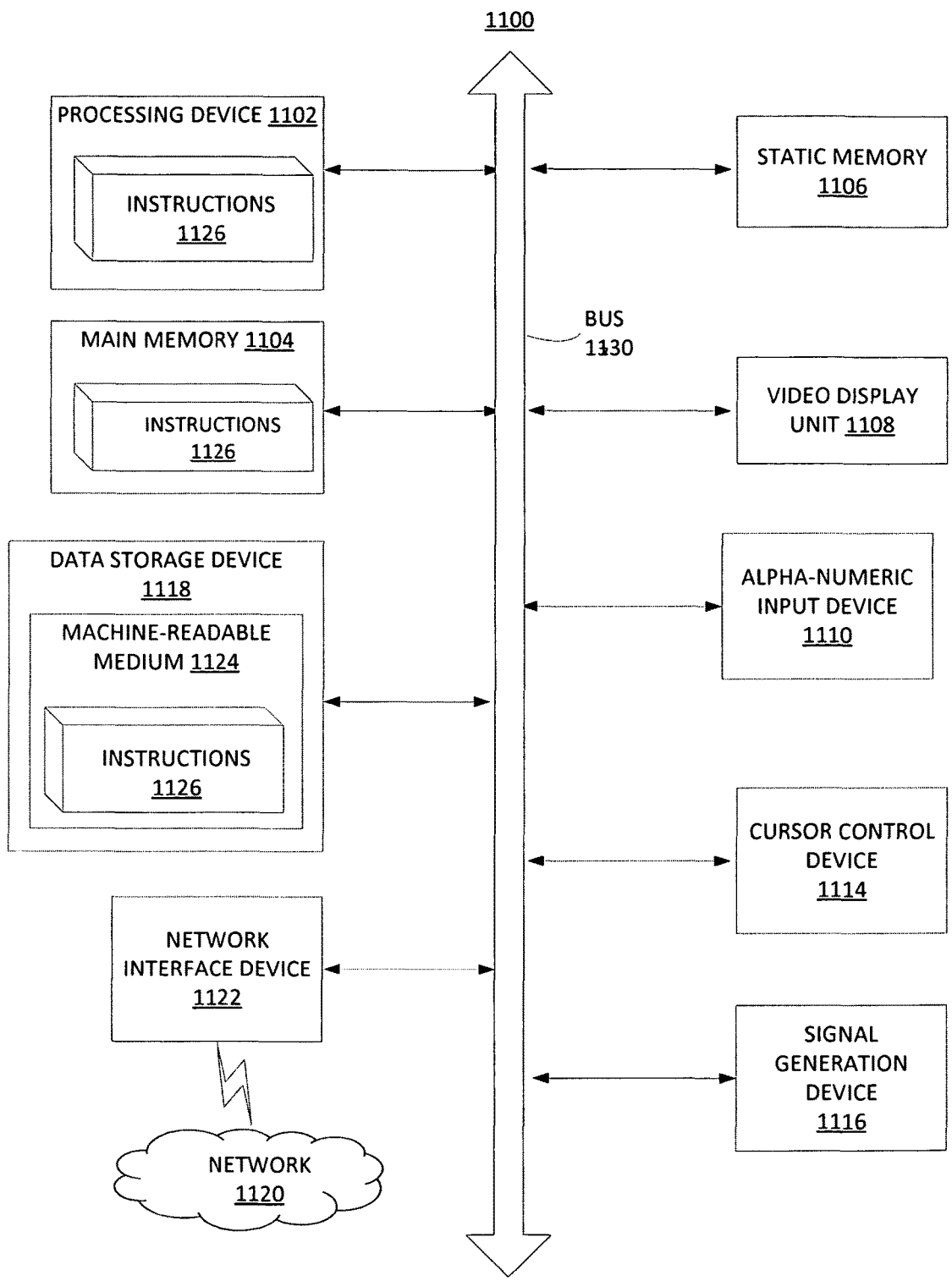
FIG. 11 illustrates another implementation of a block diagram for a computing system according to one implementation.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1100.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores. The processing device 1102 is configured to execute the processing logic 1126 for performing the operations discussed herein. In one embodiment, processing device 1102 can be part of a computing system. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1110 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic 1126 during execution thereof by the computing system 1100; the main memory 1104 and the processing device 1102 also constituting computer-readable storage media.

The computer-readable storage medium 1124 may also be used to store instructions 1126 utilizing the processing device 1102, such as described with respect to FIG. 2, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments of the disclosure.

Example 1 is processor comprising: a first register to store a key vector comprising a plurality of key elements; a second register to store a value vector comprising a plurality of value elements associated with the key elements; an execution unit coupled to the first register and the second register, the execution unit to: compare a key input element of a key input vector to each key element of the key vector; and responsive to determining that the key input element matches a key element, generate an output vector comprising, in a position offset from a base position of the output vector equal to an offset of the key input element from a base position of the key input vector, a value element associated with the key element.

In Example 2, in the processor of Example 1, the execution unit is further to produce a permute index vector referencing key elements, wherein an entry in the permute index vector references an offset of the key element from a base position of the key vector and has an offset from the base position of the permute index vector equal to the offset of the key input element.

In Example 3, in the processor of Example 2, to generate an output vector, the execution unit is to: identify the value element based on the value of the entry in the permute index vector, wherein the offset of the value element from a base element of the value vector is equal to the value of the entry in the permute index vector; and store the value element to the output vector in a position offset form the base position of the output vector equal to the offset from the base position of the permute index vector.

In Example 4, in the processor of Example 2, the execution unit is to store, to the permute index vector, a mask value for a second key input element that does not match any key element.

In Example 5, in the processor of Example 1, the second register stores the plurality of key elements in sorted order, wherein each key has a particular offset and comprises an integer value that is larger than the value of any key having a smaller offset from the base position of the key vector.

In Example 5, in the processor of Example 1, the execution unit is further to compare each key element to each key input element in parallel.

In Example 7, in the processor of Example 6, the processor further comprises a plurality of digital comparators coupled to the first register, wherein to compare each key element to each key input element comprises the execution unit to provide each of the plurality of key input elements and each of the plurality of key elements to the plurality of digital comparators.

In Example 8, in the processor of Example 7, the processor further comprises a third register coupled to the plurality of digital comparators, wherein the third register is to store the key input vector.

Example 9 is a processor comprising: a processor core; and a memory element coupled to the processor core, wherein the memory element comprises microcode to cause the processor core to: store a key vector comprising a plurality of key elements in a first register; store a value vector comprising a plurality of value elements in a second register, wherein each value element is associated with a key element; receive a key input vector comprising a plurality of key input elements; compare each key element to each key input element to determine a subset of key elements, wherein each key element in the subset of key elements matches at least one of the plurality of key input elements; and store a subset of value elements to a third register, wherein each value element in the subset of value elements in the third register is associated with a key element in the subset of key elements and in a position offset from a base position of the third register equal to an offset of an associated key input element from a base position of the key input vector.

In Example 10, in the processor of Example 9, the processor core is further to: generate a permute index vector based on key elements that match key input elements; and perform a vector permute operation using the permute index vector and the value vector.

In Example 11, in the processor of Example 10, to generate a permute index, the processor core is to store, to the permute index vector, an entry having an offset from a base position of the permute index equal to the offset of an associated key input element from the base position of the key input element and having a value referencing the position of a key element that matches the key input element.

In Example 12, in the processor of Example 10 to perform a vector permute operation, the processor is to: identify a value element based on a value of an entry in the permute index vector, wherein the offset of the value element from a base element of the value vector is equal to the value of the entry in the permute index vector; and store the value element to the third register in a position offset form the base position of the third register equal to the offset of the entry in the permute index vector from the base position of the permute index vector.

In Example 13, in the processor of Example, the processor core is further to provide a mask value to the permute index vector in response to determining that a key input element of the key input vector does not match any key element in the key vector.

In Example 14, in the processor of Example 9, the processor core is further to compare each key element to each key input element in parallel using a single input multiple data register.

Example 15 is a method comprising: storing a key vector comprising a plurality of key elements to a first processor register; storing a value vector comprising a plurality of value elements to a second processor register, wherein each value element is associated with a key element; receiving a plurality of key input elements; comparing, by a processor, each key input element to each key element to determine a subset of key elements, wherein each key element in the subset of key elements matches one of the key input elements; determining a subset of the plurality of value elements, wherein each element in the subset of value elements is associated with one of the key elements in the subset of key elements; and storing, by the processor, each element in the subset of the plurality of value elements in a position in a third register offset from a base position of the third register equal to an offset of an associated key input element from a base position of the key input vector.

In Example 16, the method of Example 15 further comprises generating, by the processor, a permute index vector having entries referencing the position in the value vector of value elements associated with key elements in the subset of key elements, wherein each entry in the permute index vector has an offset from a base position of the permute index vector equal to an offset of an associated key input element from a base position of the associate key input element.

In Example 17, in the method of Example 16, storing the subset of value elements comprises: identifying, by the processor, a value element based on a value of an entry in the permute index vector; and storing the value element to the third register in a position offset from the base position of the third register equal to the offset of the entry in the permute index vector from the base position of the permute index vector.

In Example 18, the method of Example 16 further comprises storing a mask value to the index vector in response to determining that a key input element does not match any key element, wherein the position of the mask value in the index vector has an offset equal to an offset of the key input element.

In Example 19, the method of Example 15 further comprises storing a mask value to the third register in response to determining that a key input element does not match any key element, wherein the position of the mask value in the third register has an offset equal to an offset of the key input element.

In Example 19, the method of Example 15 comparing each element of the key input vector to each element of the key vector is performed in parallel using vector registers.

Example 21 is a machine readable medium including code, when executed, to cause a machine to perform the method of any one of Examples 15 to 20.

Example 22 is an apparatus comprising means for performing the method of any one of claims 15 to 20.

Example 23 is a apparatus comprising a processor configured to perform the method of any one of claims 15 to 20.

Example 24 is an apparatus comprising: means for storing, a key vector comprising a plurality of key elements to a first processor register and a value vector comprising a plurality of value elements to a second processor register, wherein each value element is associated with a key element; means for receiving a plurality of key input elements; means for comparing each key input element to each key element to determine a subset of key elements, wherein each key element in the subset of key elements matches one of the key input elements; means for determining a subset of the plurality of value elements, wherein each element in the subset of value elements is associated with one of the key elements in the subset of key elements; and means for storing each element in the subset of the plurality of value elements in a position in a third register offset from a base position of the third register equal to an offset of an associated key input element from a base position of the key input vector.

In Example 25, in the method of Example 24, the apparatus further comprises means for generating a permute index vector having entries referencing the position in the value vector of value elements associated with key elements in the subset of key elements, wherein each entry in the permute index vector has an offset from a base position of the permute index vector equal to an offset of an associated key input element from a base position of the associate key input element; means for identifying, a value element based on a value of an entry in the permute index vector; and means for storing the value element to the third register in a position offset from the base position of the third register equal to the offset of the entry in the permute index vector from the base position of the permute index vector.

In Example 26, in the method of Example 24, the apparatus further comprises means for storing a mask value to the third register in response to determining that a key input element does not match any key element, wherein the position of the mask value in the third register has an offset equal to an offset of the key input element.

In Example 27, in the method of Example 24, the apparatus further comprises means for generating a permute index vector having entries referencing the position in the value vector of value elements associated with key elements in the subset of key elements, wherein each entry in the permute index vector has an offset from a base position of the permute index vector equal to an offset of an associated key input element from a base position of the associate key input element;

In Example 28, in the method of Example 27, the apparatus further comprises means for identifying, a value element based on a value of an entry in the permute index vector; and means for storing the value element to the third register in a position offset from the base position of the third register equal to the offset of the entry in the permute index vector from the base position of the permute index vector.

Example 29 is a system comprising: a processor core; and a memory element coupled to the processor core, wherein the memory element comprises microcode to cause the processor core to: store a key vector comprising a plurality of key elements in a first register; store a value vector comprising a plurality of value elements in a second register, wherein each value element is associated with a key element; receive a key input vector comprising a plurality of key input elements; compare each key element to each key input element to determine a subset of key elements, wherein each key element in the subset of key elements matches at least one of the plurality of key input elements; and store a subset of value elements to a third register, wherein each value element in the subset of value elements in the third register is associated with a key element in the subset of key elements and in a position offset from a base position of the third register equal to an offset of an associated key input element from a base position of the key input vector.

In Example 30, in the system of Example 29, the processor core is further to: generate a permute index vector based on key elements that match key input elements; and perform a vector permute operation using the permute index vector and the value vector In Example 31, in the system of Example 30, to generate a permute index, the processor core is to store, to the permute index vector, an entry having an offset from a base position of the permute index equal to the offset of an associated key input element from the base position of the key input element and having a value referencing the position of a key element that matches the key input element.

In Example 31, in the system of Example 30, to perform a vector permute operation, the processor core is to: identify a value element based on a value of an entry in the permute index vector, wherein the offset of the value element from a base element of the value vector is equal to the value of the entry in the permute index vector; and store the value element to the third register in a position offset form the base position of the third register equal to the offset of the entry in the permute index vector from the base position of the permute index vector.

In Example 33, in the system of Example 30, the processor core is further to provide a mask value to the permute index vector in response to determining that a key input element of the key input vector does not match any key element in the key vector.

In Example 34, in the system of Example 29, the processor core is further to compare each key element to each key input element in parallel using a single input multiple data register.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to implementing a key value lookup instruction in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices.

Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the examples herein describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present invention are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a first register to store a key vector comprising a plurality of key elements;
   a second register to store a value vector comprising a plurality of value elements, wherein each individual value element of the plurality of value elements respectively corresponds, as a key value pair, to an individual key element of the plurality of key elements;
   an execution unit coupled to the first register and the second register, the execution unit to, in response to a decoded key value lookup instruction:
      compare, in parallel, each of a plurality of key input elements of a key input vector to each of the plurality of key elements of the key vector;
      generate a permute index vector based on a comparison of the plurality of key input elements of the key input vector to each of the plurality of key elements of the key vector, wherein index values stored in positions of the permute index vector identify positions of matching key elements within the key vector;
      determine that a first key input element of the plurality of key input elements matches a first key element of the plurality of key elements;
      generate an output vector comprising, in a first position offset from a base position of the output vector equal to a first offset of the first key input element from a base position of the key input vector, a first value element, of the value vector that corresponds to the first key element of the key vector;
      determine that a second key input element of the plurality of key input elements matches a second key element of the plurality of key elements; and
      store, to the output vector in a second position offset from the base position of the output vector equal to a second offset of the second key input element from the base position of the key input vector, a second value element, of the value vector, that corresponds to the second key element of the key vector; and
   wherein to generate the output vector, the execution unit is further to:
      retrieve the first value element from the value vector corresponding to a first index value of a first entry in the permute index vector;
      store the first value element to the first position of the output vector;
      retrieve the second value element corresponding to a second index value of a second entry in the permute index vector; and
      store the second value element to the second position of the output vector.

2. The processor of claim 1, wherein the execution unit is further to generate the permute index vector comprising values that correspond to respective offsets for the plurality of key elements in the key vector, wherein a first entry in the permute index vector comprises a first offset of the first key element from a base position of the key vector and has a third offset from a base position of the permute index vector equal to the first offset of the first key input element from the base position of the key in put vector.

3. The processor of claim 2, wherein to generate the output vector, the execution unit is to:
   identify the first value element based on a first value of the first entry in the permute index vector, wherein first offset of the first value element from a base element of the value vector is equal to the first value of the first entry in the permute index vector; and
   store the first value element to the output vector in a position offset from the base position of the output vector equal to the third offset from the base position of the permute index vector.

4. The processor of claim 2, wherein the key input vector comprises the plurality of key input elements, wherein the execution unit is to store, to the permute index vector, a mask value for a third key input element of the plurality of key input elements that does not match any key element.

5. The processor of claim 1, wherein the second register stores the plurality of value elements in sorted order, wherein each key element has a particular offset and comprises a n integer value that is larger than the value of any key element having a smaller offset from the base position of the key vector.

6. The processor of claim 1, further comprising a plurality of digital comparators coupled to the first register, wherein to compare each key element to each key input element comprises the execution unit to provide each of the plurality of key input elements and each of the plurality of key elements to at least one of the plurality of digital comparators.

7. The processor of claim 6, further comprising a third register coupled to the plurality of digital comparators, wherein the third register is to store the key input vector.

8. A processor comprising:
   a processor core; and
   a memory element coupled to the processor core, wherein the memory element comprises microcode to cause the processor core to:
      store a key vector comprising a plurality of key elements in a first register,
      store a value vector comprising a plurality of value elements in a second register, wherein each individual value element of the plurality of value elements respectively corresponds, as a key value pair, to an individual key element of the plurality of key elements;
      receive a key input vector comprising a plurality of key input elements;
      generate a permute index vector based on a comparison of each of the plurality of key input elements of the key input vector to each of the plurality of key elements of the key vector, wherein index values stored in respective positions of the permute index vector correspond to positions of matching key elements with in the key vector; and store a subset of value elements from the value vector to a third register, wherein each value element in the subset of value elements respectively corresponds to a value element, in the value vector, stored in a position defined by an index value in an entry of the permute index vector, wherein the entry is located at a position within the permute index vector that corresponds to the position of a key input element, within the key input vector, that matches the key element corresponding to the value element.

9. The processor of claim 8, wherein the processor core is further to determine the subset of the value elements via performance of a vector permute operation using the permute index vector and the value vector.

10. The processor of claim 9, wherein to generate the permute index vector, the processor core is to store, to the permute index vector, an entry comprising:

an offset from a base position of the permute index vector equal to an offset of an associated key input element from a base position of the key in put element; and an index value referencing a position of a key element that matches the key input element.

11. The processor of claim 9, where into perform the vector permute operation, the processor core is to:

identify a first value element based on a first index value of a first entry in the permute index vector, wherein an offset of the first value element from a base position of the value vector is equal to the first index value of the first entry in the permute index vector; and store the first value element to the third register in a position offset from a base position of the third register equal to an offset of the first entry in the permute index vector from a base position of the permute index vector.

12. The processor of claim 9, wherein the processor core is further to provide a mask value to the permute index vector in response to determining that a key input element of the key input vector does not match any key element in the key vector.

13. The processor of claim 8, wherein the processor core is further to compare each key element to each key input element in parallel using a single input multiple data register.

14. A method comprising:

storing, a key vector comprising a plurality of key elements to a first processor register;

storing, a value vector comprising a plurality of value elements to a second processor register, wherein each individual value element of the plurality of value elements respectfully corresponds, as a key value pair, to an individual key element of the plurality of key elements;

receiving a key input vector comprising a plurality of key input elements;

generating, by a processor, a permute index vector based on a comparison of each of the plurality of key input elements of the key input vector to each of the plurality of key elements of the key vector, wherein index values stored in respective positions of the permute index vector correspond to positions of matching key elements within the key vector;

determining a subset of the plurality of value elements, wherein each element in the subset of the plurality of value elements respectively corresponds to a value element in the value vector for which a match is indexed within the permute index vector; and storing, by the processor, each element in the subset of the plurality of value elements in a position, within a third register, defined by an index value in an entry of the permute index vector, wherein the entry is located at a position within the permute index vector that corresponds to a position of a key input element, within the key input vector, that matches the key element corresponding to the value element.

15. The method of claim 14, wherein each entry in the permute index vector has an offset from a base position of the permute index vector equal to an offset of an associated key input element from a base position of the associated key in put element.

16. The method of claim 15, wherein storing the subset of the plurality of value elements comprises:

identifying, by the processor, a value element based on a value of an entry in the permute index vector; and storing the value element to the third register in a position offset from a base position of the third register equal to the offset of the entry in the permute index vector from the base position of the permute index vector.

17. The method of claim 15, further comprising storing a mask value to the permute index vector in response to determining that a first key in put element does not match any key element, wherein the position of the mask value in the permute index vector has an offset equal to an offset of the first key input element.

18. The method of claim 14, further comprising storing a mask value to the third register in response to determining that a first key input element does not match any key element, wherein the position of the mask value in the third register has an offset equal to an offset of the first key input element.

19. The method of claim 14, wherein comparison of each element of the key input vector to each element of the key vector is performed in parallel by the processor using vector registers.

* * * * *

UNITED STATES PATENT AND TRADEMARK OFFICE
CERTIFICATE OF CORRECTION

PATENT NO. : 10,409,613 B2
APPLICATION NO. : 14/757995
DATED : September 10, 2019
INVENTOR(S) : Asit K. Mishra et al.

It is certified that error appears in the above-identified patent and that said Letters Patent is hereby corrected as shown below:

In the Claims

In Claim 1, Column 27, Line 66, delete "i" at end of the line

In Claim 1, Column 27, Line 67, delete "n" and insert --in--

In Claim 3, Column 28, Line 23, delete "i n" and insert --in--

In Claim 8, Column 29, Line 3, delete "with in" and insert --within--

Signed and Sealed this
Twenty-ninth Day of October, 2019

Andrei Iancu
*Director of the United States Patent and Trademark Office*